Figure 1:
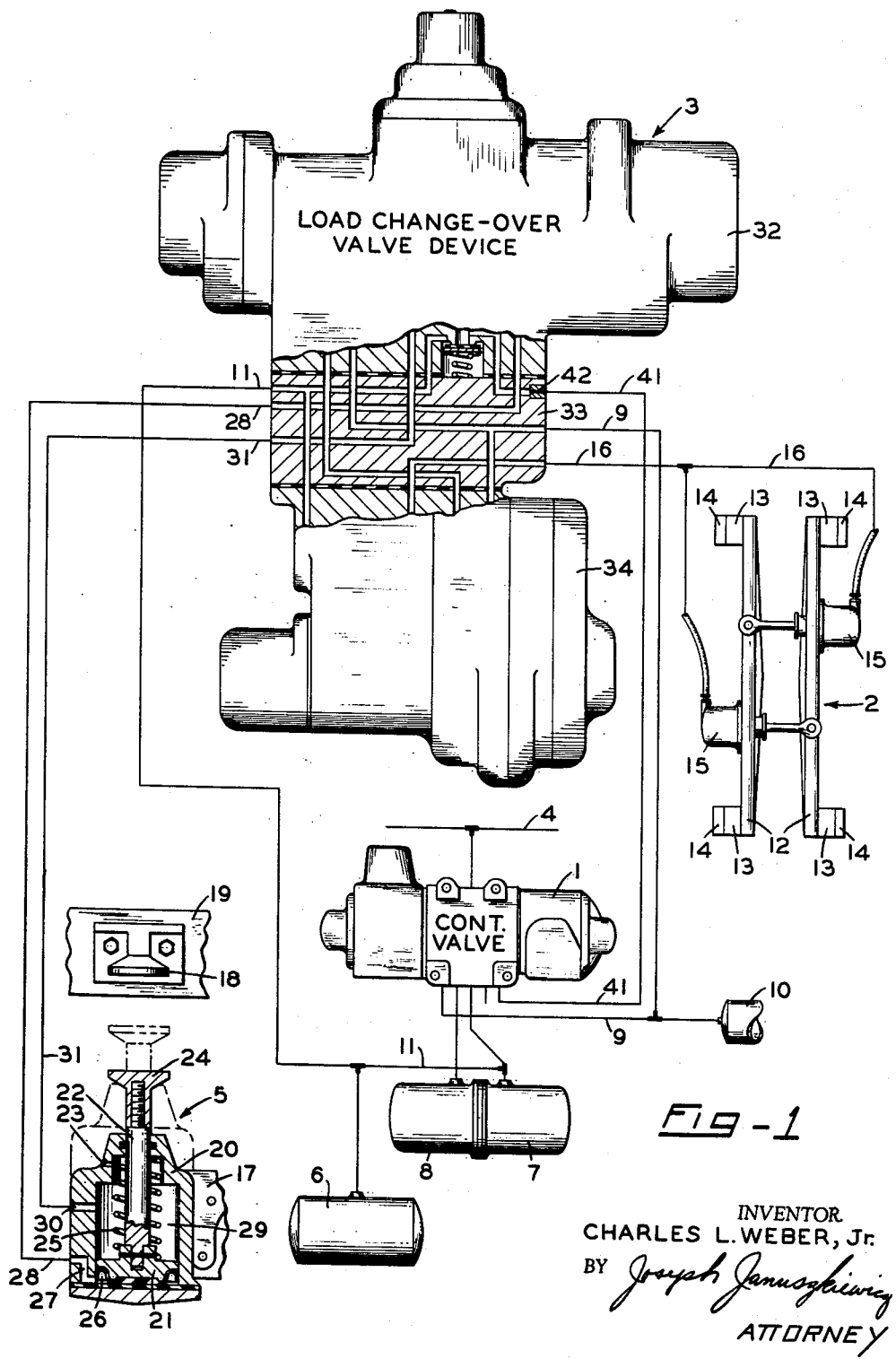

Feb. 16, 1965 C. L. WEBER, JR 3,169,803
RELAY VALVE DEVICE
Filed June 27, 1963 2 Sheets-Sheet 1

INVENTOR.
CHARLES L. WEBER, Jr.
BY Joseph Januszkiewicz
ATTORNEY 3,169,803
RELAY VALVE DEVICE
Charles L. Weber, Jr., Irwin, Pa., assignor to Westinghouse Air Brake Company, Wilmerding, Pa., a corporation of Pennsylvania
Filed June 27, 1963, Ser. No. 290,985
11 Claims. (Cl. 303—23)

This invention relates to fluid pressure brake apparatus for railway vehicles and more particularly to load controlled fluid pressure brake apparatus.

Brake systems for railway vehicles employing change-over valve devices operate to compensate the braking action for load and empty conditions of a railway car. Such change-over valve devices customarily employ differential type relay valves, having a plurality of diaphragms of different effective areas, in which the ratio of the delivery pressure to the control pressure can be varied in accordance with the area of the particular diaphragm selected. However, it is a characteristic of relay valves that the pressure supplied to the brake cylinders for low relay control pressures may be insufficient to bring the brake shoes into contact with the tread of the car wheels. To correct this deficiency inshot arrangements have been devised for causing the relay to provide adequate brake cylinder pressures for low control pressures. The present invention provides a novel relay valve device particularly useful in the changeover valve device, which relay valve device is very simple, economical to manufacture, reliable and operative to eliminate the above-mentioned difficulty under a no-load condition for low relay control pressures. While the relay valve device of the present invention has particular utility in the change-over valve device, such relay valve device can be utilized in other applications separate and apart from the change-over valve device.

It is an object of this invention to provide a new and improved change-over valve device having novel relay valve means for providing under no-load and minimum brake application conditions a full range of braking action as well as a full range of braking action under a loaded car condition, wherein such valve device is simple in design yet facilitates ease of manufacturing while reducing cost. In addition, the improved design is applicable to existing change-over valve devices with only small modifications.

In accordance with this invention, the relay valve portion of the change-over valve device comprises a sectionalized casing containing a differential piston in the form of coaxial spaced diaphragms of different size, wherein the diaphragms cooperate with the casing to define three adjoining chambers, that is, an intermediate chamber and two outer chambers, such that the differential piston is adapted to actuate a valve member cooperative with a valve seat. A load measuring device is operatively connected to the change-over valve to condition a selector valve under an empty car condition to supply pressurized fluid upon a brake application to one of the outer chambers defined by the smaller diaphragm to actuate the valve member. Actuation of such valve member pressurizes the brake cylinder and simultaneously pressurizes a chamber controlled by a preloaded check valve. The preloaded check valve is responsive to a predetermined build-up of pressure in such chamber to connect the pressurized fluid from such chamber to the outer chamber to balance the differential piston and lap such valve member. Such preloading of the check valve provides a time delay assuring a build-up of pressure in the brake cylinders under conditions of a minimum brake application and no-load condition as well as a loaded condition of a railway car to assure movement of the brake shoes into contact with the tread of the wheel.

Figure 2:
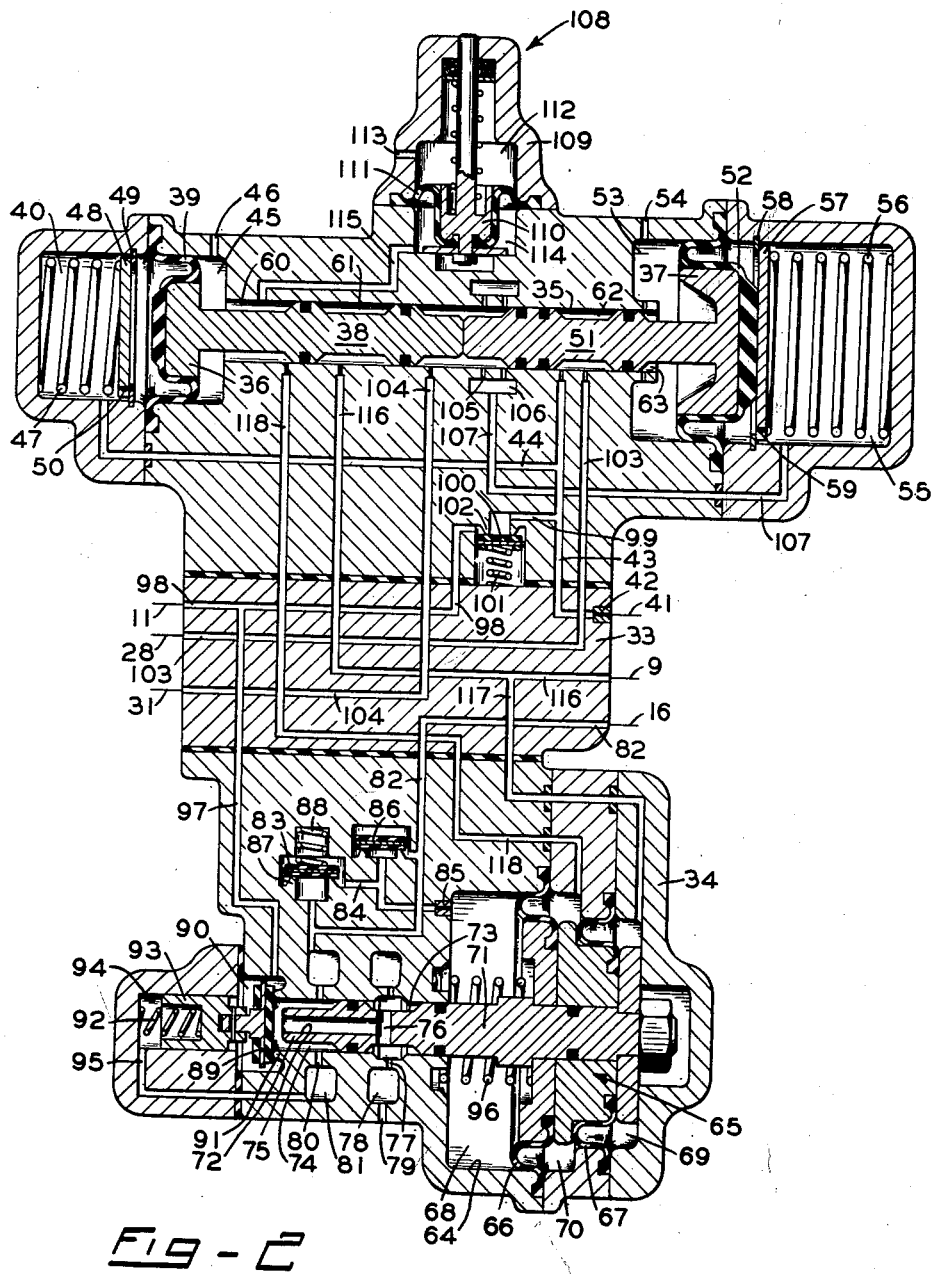

In the drawings:
FIG. 1 is a diagrammatic view, partly in section, showing a railway car brake equipment which includes a novel brake control apparatus for automatically controlling brake pressure according to the loaded or empty condition of a railway car.
FIG. 2 is a cross-sectional view of the change-over valve device shown in FIG. 1.

As shown in FIG. 1 of the drawings, the fluid pressure brake equipment comprises a brake control valve device 1, brake means 2, a load change-over valve device 3, brake pipe 4, load measuring device 5, air reservoir 6, auxiliary reservoir 7, and emergency reservoir 8.

The brake control valve device 1 is of the usual well-known type which responds to the charging of the brake pipe 4 to charge the auxiliary reservoir 7 and emergency reservoir 8 in a manner well known and understood in the art and which responds to a reduction in pressure in brake pipe 4 to direct pressurized fluid from the auxiliary reservoir 7 via a brake cylinder supply pipe 9 to the load change-over valve device 3 for a braking application. The supply pipe 9 is connected to a displacement volume reservoir 10 to compensate for the limited volume acted upon in the changeover valve device 3 by the pressurized fluid from the air reservoir 6, auxiliary reservoir 7 and emergency reservoir 8. A conduit 11 has branch conduits interconnecting the air reservoir 6, the auxiliary reservoir 7, the brake control valve device 1 and a passageway in the change-over valve device 3 for a purpose to be described.

The brake means 2 comprises a pair of brake beams 12 that normally extend crosswise of the railway car in parallel-spaced relationship to each other. The brake beams 12 are adapted to be movably supported at each end of the side frame members of a car truck in a manner well understood in the art. Supported adjacent the outer ends of each brake beam 12 are brake heads 13 which carry brake shoes 14, respectively, for contact with the brake tread of an associated wheel. Each brake beam 12 has suitably rigidly secured thereto a brake cylinder 15 in which is reciprocably mounted a piston whose rod is secured to the oppositely disposed brake beam 12 such that pressurization of the respective cylinder end of each brake cylinder 15 causes the respective brake shoes 14 to contact the associated adjacent wheels for a braking application in a manner well understood in the art. Pressurized fluid is supplied to the respective brake cylinders 15 via a conduit 16 connected to a passageway in the change-over valve device 3.

The load measuring device 5 (FIG. 1) is mounted on a suitable sprung portion of a railway car, such as the car truck bolster, by a bracket 17 substantially in line with a stop member 18. Stop member 18 is suitably mounted on a bracket 19, which bracket 19 is suitably attached to an unsprung part of the car truck, such as the side frame of the car truck. Engagement between stop member 18 and the load measuring device 5 operates in a manner to be described.

The load measuring device 5 comprises a vertically disposed strut cylinder 20, in which cylinder 20 is slidably mounted a control piston 21 having a piston rod 22 extending through and slidably guided in the non-pressure head of the upper portion of cylinder 20. The upper end portion of strut cylinder 20 closely adjacent the non-pressure head is vented to atmosphere via a port 23. The uppermost end portion of the piston rod 22 has a stop member 24 adjustably mounted thereon for engagement with the stop member 18. A spring 25 encompassing the piston rod 21 has its upper end seated on the upper end portion of strut cylinder 20 and its lowermost end portion engaging the piston 21 whereby the spring 25 urges the piston 21 to its lowermost position in the strut cylinder 20 as shown in FIG. 1. A pressure chamber 26, at the lower end portion of strut cylinder 20, defined by the piston 21 and the lowermost end portion of cylinder 20 is connected via a passageway 27 to a conduit 28 for connection to the change-over valve device 3. A non-pressure chamber 29, at the upper end portion of strut cylinder 20, defined by a piston 21 and the upper end portion of strut cylinder 20 is connected via a passageway 30 to a conduit 31 for connection to the change-over valve device 3. In a loaded condition of a railway car, the stop member 24 is a greater distance from the stop member 18 than when the car is empty, since the stop member 24 is on the sprung portion of the railway car and the springs supporting the sprung portion are compressed in accordance with the degree of loading on the sprung portion.

The term "empty railway car" designates an unloaded, partially loaded, or empty condition of a railway car, such that on pressurization of chamber 26, the upward movement of piston 21 is insufficient to establish communication between passageways 27 and 30, whereas a loaded railway car designates a railway car that is fully loaded or partially loaded, such that on pressurization of chamber 26, the upward movement of piston 21 is sufficient to establish communication between passageways 27 and 30.

The load change-over valve device 3 (FIG. 2) comprises a sectionalized casing having a change-over valve portion 32, a pipe bracket portion 33 and a relay valve portion 34.

Change-over valve portion 32 has a bore 35 extending longitudinally therethrough, which bore 35 has its respective end portions communicating with enlarged bore portions. The respective enlarged bore portions communicating with bore 35 have motor pistons 36, 37, respectively. The adjacent ends of motor pistons 36 and 37 are operatively connected together by stem portions in a manner to be described. Motor piston 36 includes a rearwardly extending stem portion 38 which is slidably received by the bore 35 and a forwardly disposed portion which is suitably connected to an annular flexible diaphragm 39. The outer periphery of annular flexible diaphragm 39 is clamped between portions of the sectionalized casing of change-over valve device 3. The diaphragm 39 is subject on one side to the pressure of fluid in a control chamber 40, which chamber 40 has fluid under pressure supplied thereto from a charging pipe 41 via a choke 42, a passageway 43 and a branch passageway 44. In accordance with the usual practice, charging pipe 41 has one end constantly open to the brake pipe 4 through the brake control valve device 1 and the other end connected to the passageway 43 to maintain control chamber 40 at brake pipe pressure. The other side of diaphragm 39 is subject to pressure in a chamber 45 which is constantly open to atmosphere via a port 46. Chamber 40 houses a spring 47, which spring 47 has one end seated on the inner end wall thereof and the other end abuttingly engaging a follower disc 48 thereby biasing disc 48 into engagement with the motor piston 36. The inner wall portion of the sectionalized casing defining chamber 40 has an annular recess, which recess receives an annular stop ring 49. The stop ring 49 limits the movement of follower disc 48 toward the motor piston 36 as illustrated in FIG. 2. Follower disc 48 is suitably recessed as at 50 to provide communication between all portions of chamber 40 to assure equalization of pressure throughout chamber 40.

Motor piston 37 has a stem portion 51 extending rearwardly therefrom and slidably received by the bore 35. The end of stem portion 51 abuttingly engages the end of stem portion 38. Motor piston 37 has its forward portion suitably connected to a diaphragm 52 whose outer peripheral edge is suitably clamped between portions of the sectionalized casing of the change-over valve device 3. Diaphragm 52 is subject on one side to pressure in a chamber 53 which is constantly open to atmosphere via a passageway 54, and on its opposite side to pressure in a chamber 55, which chamber 55 is subject to being pressurized by the brake pipe fluid in a manner to be described.

It will be noted that the effective cross-sectional area of the motor piston 37 is greater than motor piston 36, such that when the brake pipe pressure is introduced into chambers 55 and 40 in a manner to be described, the total resultant force exerted on pistons 36 and 37 will be such as to move motor pistons 36 and 37 with their respective stem portions leftward as viewed in FIG. 2.

Chamber 55 houses a spring 56 which has one end seated on the inner wall surface of the chamber 55 and the other end abuttingly engaging a follower disc 57 for biasing follower disc 57 into engagement with the motor piston 37. The inner wall of chamber 55 has an annular recess which receives an annular stop ring 58, which stop ring 58 limits the movement of follower disc 57 toward the motor piston 37. Follower disc 57 is suitably recessed or grooved as at 59 on its outer periphery to provide fluid communication between all portions of chamber 55 to assure equalization of pressure throughout chamber 55. Stem 38 of motor piston 36 has a reduced end portion and a pair of annular grooves 60 and 61 to define a pair of spaced lands therebetween, which lands slidingly contact the inner wall surface of bore 35. Stem 51 of motor piston 37 similarly has a reduced end portion and a pair of spaced annular grooves 62 and 63 defining land portions therebetween, which land portions slidably engage the inner wall surface of the bore 35. The lands and grooves of stems 38 and 51 operate to cover and uncover ports in a manner to be described.

Relay valve portion 34 has a stepped bore 64 which houses a relay valve device 65. Relay valve device 65 has a pair of spaced diaphragms 66 and 67 whose outer peripheral edges are clamped between portions of the sectionalized casing of the relay valve portion 34. Diaphragms 66 and 67 cooperate with the sectionalized casing to define a pair of spaced outer chambers 68, 69 and an intermediate chamber 70. The one outer chamber 68 is hereinafter referred to as the balancing chamber 68. Relay valve device 65 has a stem 71, which stem 71 has a reduced end portion 72. In addition, stem 71 has an annular groove 73 on the intermediate portion thereof. The reduced end portion 72 of stem 71 cooperates with the inner wall surface of the adjacent bore portion of stepped bore 64 to provide a clearance space 74, which clearance space 74 communicates via a longitudinally extending bore 75 in the end portion of stem 71 to a plurality of radially extending ports 76, which ports 76 communicate with the annular groove 73. In the normal position of the relay valve device 65 in which it is shown in FIG. 2, annular groove 73 is connected to atmosphere via radially extending ports 77, an annular groove 78 and a port 79. Thus, the clearance space 74 is vented to atmosphere via bore 75, ports 76, annular groove 73, ports 77, annular groove 78 and port 79. In addition, clearance space 74 is connected to the brake cylinders 15 via radially extending grooves 80, an annular groove 81, passageway 82 and conduit 16. The clearance space 74 is also connected to the balancing chamber 68 in a manner to be described. Under normal conditions, the brake cylinders 15 and balancing chamber 68 are vented to atmosphere via their connection to passageway 82, annular groove 80, clearance space 74, bore 75, annular groove 78 and port 77.

The clearance space 74 is connected to the balancing chamber 68 via a branch passageway connected to a passageway 82, past a preloaded check valve 83, through a passageway 84 and a choke 85. A by-pass check valve 86 interconnects passageways 82 and 84 such as to permit the passage of fluid from passageway 84 to passageway 82 upon a breakdown of pressure in passageway 82. Thus, when the brake cylinders 15 are vented in a manner to be described, the balancing chamber 68 is also vented since the chamber 68 is connected via passageway 84, past by-pass check valve 86, passageway 82, annular groove 81, clearance space 74, bore 75 to port 79 to atmosphere. Check valve 83 is normally biased into seating engagement with an annular valve seat 87 by a spring 88 to thereby normally block communication between passageways 84 and 82.

A check valve device 89 located in chamber 90 is provided for the controlling of fluid under pressure to and release of fluid under pressure from the brake cylinders 15. Check valve device 89 is normally biased onto an annular valve seat 91 by a spring 92 having one end portion seated on an end wall of a casing section and the other end engaging a sleeve 93 integral with the check valve device 89. Sleeve 93 is slidably received by a bore 94 whose one end portion is connected via a passageway 95 to annular groove 80 and the clearance space 74 to maintain bore 94 at the same pressure as clearance space 74. Under normal conditions, the bias of spring 92 maintains check valve device 89 seated on annular valve seat 91 since spring 96 biases stem 71 and relay valve device 65 out of engagement with check valve device 89. Chamber 90 is maintained pressurized at substantially the same pressure as the auxiliary reservoir 7 and the air reservoir 6 by its connection thereto via branch passageway 97, a passageway 98 and conduit 11.

In order to provide for the quick charging and recharging of the auxiliary reservoir 7 and the air reservoir 6, load change-over valve device 3 connects charging pipe 41 via passageway 43 through a passageway 99, past a one-way valve or check valve 100, passageway 98 to conduit 11. Check valve 100 is normally biased by a spring 101 into abutting engagement with a valve seat 102. Thus, as pressurized fluid flows into charging pipe 41 which is open to the brake pipe 4, the pressurized fluid flows via passageway 43, past check valve 100, through passageway 98 into conduit 11 for charging the auxiliary reservoir 7 and air reservoir 6. Such passage of fluid also charges the chamber housing spring 101 to maintain check valve 100 seated on valve seat 102. The auxiliary reservoir 7, air reservoir 6 and emergency reservoir 8 are normally charged and recharged from the brake pipe 4 via brake control valve device 1 in a conventional manner.

A passageway 103 in change-over valve device 3 connects passageway 43 and annular groove 62 on stem portion 51 (of motor piston 37) with conduit 28 from the pressure chamber 26 in strut cylinder 5 to pressurize such pressure chamber 26 during a weighing operation in a manner to be described. Conduit 31 (FIG. 2) from strut cylinder 20 is connected to the chamber 55 (adjacent motor piston 37) via passageway 104, the clearance space between the bore 35 and the reduced end portions of stems 38 and 51, ports 105, annular groove 106 and a passageway 107.

The uppermost central portion of change-over valve device 3 as viewed in FIG. 2 has a load indicating means 108 comprising an inverted cup-shaped housing 109 suitably secured to the change-over valve portion 32. A movable abutment 110 having a resilient diaphragm 111 is located in the bore between change-over valve portion 32 and the cup-shaped housing 109 with the outer peripheral edge of he diaphragm 111 clamped therebetween. Movable abutment 110 is subject on one side to the pressure in chamber 112 which is vented to atmosphere via a port 113 and on the other side to the pressure in chamber 114 which is connected via passageway 115 to the left-hand portion of bore 35, as viewed in FIG. 2.

In the operation of the brake apparatus described, it is to be assumed that an empty condition of a railway car is present. Strut cylinder 20 assumes a position relative to the unsprung portion of the railway car, such as bracket 19, that the stop member 24 will be relatively close to the stop member 18 since the car springs are not compressed as greatly as when the car is loaded. Upon pressurization of chamber 26 via conduit 28 in a manner to be described, piston 21 will move upwardly in strut cylinder 20 only a limited amount due to engagement of stop member 23 by stop member 18, such that communication is blocked between passageways 27 and 30. In addition to an empty condition of a railway car, assume initially that the brake pipe 4 is charged to its normal charge value by supply of fluid under pressure to the brake pipe 4 in a well-known manner, and that the brake control valve device 1 responds to the charging of the brake pipe 4 to charge air reservoir 6, auxiliary reservoir 7 and emergency reservoir 8 with fluid at the pressure of the fluid in the brake pipe 4. Simultaneously with such action, strained air flows through the brake control valve device 1, charging pipe 41, passageway 43, annular groove 62 of stem 51, passageway 103, conduit 28 to charge chamber 26 in the lower end portion of the strut cylinder 20 in load measuring device 5. Since the railway car is in an empty condition, as discussed above, wherein the stop member 24 is relatively close to stop member 18, pressurization of chamber 26 effects no result since the upward movement of control piston 21 does not establish communication between passageways 27 and 30. Pressurized fluid flowing via passageway 43 into the annular groove 62 flows into branch passageway 44 to charge control chamber 40. Such pressurization of control chamber 40 moves motor piston 36 and motor piston 37 rightward as viewed in FIG. 2 to condition the change-over valve device 1 for operation. In such rightward movement of motor piston 36 and motor piston 37, diaphragm 39, stems 38 and 51, and diaphragm 52 move rightward therewith. Such rightward movement blocks communication between passageways 43 and 103; however, such action connects passageway 103 to atmosphere via chamber 53 and port 54 which thereby vents chamber 26 of strut cylinder 20 to atmosphere via conduit 28, passageway 103, chamber 53 and port 54. Spring 35 in strut cylinder 20 biases control piston 21 downwardly to disengage stop member 24 from stop member 18 to thereby restore the load measuring device 5 to an inactive position following such weighing action.

Pressurization of the air reservoir 6 and auxiliary reservoir 7 during initial charging of the brake pipe 4 interconnects the pressurized fluid from the air reservoir 6 and auxiliary reservoir 7 via conduit 11, passageway 98, passageway 97 to the control chamber 90 and thereby conditions change-over valve device 3 for a braking operation in a manner to be described.

When brake pipe pressure is reduced under operator control in the usual manner to cause a brake application, brake control valve device 1 operates to supply pressurized fluid from air reservoir 6 and auxiliary reservoir 7 to the brake cylinder supply pipe 9 in the conventional manner. Such pressurized fluid flows via supply pipe 9, passageway 116, branch passageway 117 to pressurize outer control chamber 69 whereby relay valve device 65 is moved leftward as viewed in FIG. 2 such that the reduced stem portion 72 engages and unseats check valve device 89. The unseating of check valve device 89 interconnects the pressurided fluid contained in chamber 90 to the brake cylinders 15 for conditioning such brake cylinders 15 for a brake application. Pressurized fluid is supplied to chamber 90 by the open connection to the air reservoir 6 and auxiliary reservoir 7 via conduit 11 and connected therefrom to the brake cylinders 15 via the clearance space 74 provided between the reduced end portion 72 of stem 71 and the bore portion adjacent thereto, annular groove 80, passageway 82 and conduit 16. Simultaneously with the flow of such pressurized fluid, the pressurized fluid flows from the control chamber 90 via the clearance space 74, annular groove 80 to pressurize the chamber underneath the preloaded check valve 83 until sufficient pressure is developed therein to overcome the force of spring 88 and unseat check valve 83. The unseating of check valve 83 from annular seat 87 operates to connect the pressurized fluid from the control chamber 90 to the balancing chamber 68 via passageway 80, past check valve 83, through passageway 84 and choke 85, until balancing chamber 68 is sufficiently pressurized to overcome the force developed in the outer control chamber 69. Check valve device 83 is loaded by spring force 88 to approximately 4 p.s.i. differential between the fluid pressure flowing into the brake cylinders 15 as compared to the fluid pressure flowing into the balancing chamber 68, so that when fluid pressure is first admitted to control chamber 69 which has a relatively small effective piston area, the relay valve device 65 will move to admit supply pressure to the brake cylinders 15 without admitting pressurized fluid to the balancing chamber 68 until 4 p.s.i. has been established in such delivery line, passageway 82, to assure sufficient pressurization of the brake cylinders 15 upon actuation of the preloaded check valve 83 which thereby pressurized the balancing chamber 68. Such initial pressurization of the brake cylinders 15 without pressurizing the balancing chamber 68 assures the movement of the brake shoes into contact with the tread of the car wheels on a minimum brake application. The ratio of the effective area of diaphragm 67 to the effective area of diaphragm 66 of the balancing chamber 68 is such that with a four pound differential on the check valve 83 assures development of a ten pound control pressure to the control chamber 69 which will result in developing a ten pound pressure in the brake cylinders 15.

Any additional reduction in brake pipe pressure results in the additional charging of conduit 9 from the auxiliary reservoir 7 and the air reservoir 6 to thereby provide a further build-up of brake cylinder supply pressure above 10 p.s.i. With the additional brake pipe pressure reduction, pressurized fluid flows from the auxiliary reservoir 7 and air reservoir 6 through control valve device 1, thence via conduit 9 through passageways 116 and 117 to pressurize chamber 69 and unbalance differential relay valve 65 in a similar manner as described above, wherein the reduced end portion 72 unseats check valve device 89. In a similar manner as described above, the unseating of check valve device 89 interconnects pressurized fluid contained in chamber 90 via clearance space 74, annular groove 81, passageway 82 and conduit 16 to brake cylinders 15 for a further increase in brake cylinder pressure which further increases the braking action. In addition, the pressurized fluid from control chamber 90 flows via annular groove 80 and passageway 82 past preloaded check valve 83 upon sufficient development of pressure thereunder, thence via passageway 84, choke 85 into balancing chamber 68 until sufficient pressure is developed within the balancing chamber 68 to overcome the increase in pressurization of outer control chamber 69 such that the stem portion 72 and relay valve device 65 moves rightward as viewed in FIG. 2 to permit the seating of check valve device 89 on annular seat 91. It will be noted that the unseating of check valve device 89 interconnects the pressurized fluid from chamber 90 via clearance space 74 and annular groove 81 to a passageway 95 which connects the pressurized fluid to the chamber behind sleeve 93 to maintain a force on differential relay check valve 89 to continuously bias such check valve device 89 into seating engagement with the annular seat 91.

Further reduction in brake pipe pressure initiates a similar cycle in which the brake control valve device 1 establishes communication between air reservoir 6, auxiliary reservoir 7, and conduit 9 to pressurize outer chamber 69 which unseats check valve device 89 as described above to thereby effect a further braking application on a reduced ratio in accordance with the effective diaphragm sizes as set forth above.

In the event that a further reduction in brake pipe pressure initiates an emergency brake application, a similar cycle is repeated wherein the brake control valve device 1 establishes communication between the air reservoir 6, auxiliary reservoir 7 and the emergency reservoir 8 to pressurize outer chamber 69 such that upon the unseating of check valve device 89, pressurized fluid from the respective reservoirs flows via conduit 11, passageway 97, chamber 90, clearance space 74, passageways 82, 81 and conduit 16 to the respective brake cylinders 15 to effect a maximum brake application.

When the pressure in the brake pipe 4 is increased to release the brakes, the brake cylinder supply pipe 9 via control valve device 1 is connected to atmosphere, thereby connecting outer control chamber 69 via passageways 117, 116, conduit 9 to atmosphere and consequently moves relay valve device 65 rightwardly as viewed in FIG. 2 until the reduced end portion 72 is displaced rightwardly with respect to the check valve device 89. Such action releases the brakes since the brake cylinders 115 are connected to atmosphere via conduit 16, passageway 82, annular groove 81, passageway 80, clearance space 74, bore 75 in stem 71, annular groove 73, passageway 79, annular groove 78 and port 77.

Assuming that the brake pipe 4 has been vented to below 10 p.s.i. or to atmosphere for emergency application of the brakes, the fluid pressure in charging pipe 41, passageway 43, branch passageway 44, as well as control chamber 40, will be vented to atmosphere thereby subjecting stems 38 and 51, motor pistons 36 and 37 only to the forces of the respective springs 47 and 56 which thereby centers the stems 38 and 51 into their neutral position or zone as shown in FIG. 2. Upon recharging of the brake pipe 4 under these conditions, the load measuring device 5 operates to check the loaded or empty condition of the railway car. In the event that the railway car is empty, the operation is as described above; however, if the railway car is loaded, the change-over valve device 3 is conditioned in a manner to be described. It should be noted that the load measuring device 5 is subject to being actuated to register a loaded or empty condition for a railway car whenever an emergency brake pipe reduction has been effected, such that the stems 47 and 63 are in neutral and are in condition for directing fluid to the load measuring device 5 upon a subsequent recharging of the brake pipe.

Assuming a neutral position of stems 38 and 51 and a loaded condition of a railway car, the position of the strut cylinder 20 relative to the unsprung portion 19 of the railway car is such as is shown in full lines in FIG. 1, wherein the stop member 24 on the movable piston rod 22 is in such a position that upward movement of the stop member 24 relative to the stop member 18 is such as to uncover passageway 30 and establish communication between passageways 27 and 30.

On charging of the brake pipe 4, pressurized fluid will flow via the brake pipe 4 through the brake control valve device 1, via charging conduit 41 to the control chamber 40 and the load measuring device 5. Charging pipe 41 conducts pressurized fluid via passageway 43, annular groove 62 of stem 51, pasageway 103, conduit 28 to chamber 26 in strut cylinder 20 to exert an upward force upon control piston 21.

Piston 21 moves upwardly to establish communication between passageways 27 and 30. Such action permits the flow of pressurized fluid from control chamber 26 in strut cylinder 20, via conduit 31, through passageway 104 and thence through bore 35 in the clearance space provided by the reduced end portions of the respective stems 38 and 51, through passageway 107 to the control chamber 55 on the right-hand portion of the change-over valve device 3. Pressurization of chamber 55 is opposed by the pressurization of control chamber 40 which is pressurized via passageways 44 and 43 from charging pipe 41. The differential force developed between pressurization of chambers 55 and 40 and their respective diaphragms 52 and 39 is such as to move the motor pistons 36 and 37 leftward as viewed in FIG. 2, since the diaphragm 52 and motor piston 37 are larger in effective cross-sectional area than the effective cross-sectional area of diaphragm 39 and motor piston 36. Such leftward movement of stems 38 and 51 operates to block communication between passageways 43 and 103; however, communication is established between passageway 43 and passageway 107 to thereby maintain pressurization of chamber 55 from the charging pipe 41. Such leftward movement of stems 38 and 51 also establishes communication between passageway 116 and a passageway 118, which passageway 118 is connected to the intermediate chamber 70 of the relay valve device 65. Such leftward movement also vents chamber 26 in strut cylinder 20 atmosphere since the annular groove 63 on stem 51 registers passageway 103 with the chamber 53 which is continually vented to atmosphere via port 54. The compressed spring 25 in strut cylinder 20 operates to return control piston 21 downwardly to aid in the exhaustion of the pressurized fluid from control chamber 26. Chamber 29 in strut cylinder 20 is vented to atmosphere via port 23. In addition, port 23 vents conduit 31 upon movement of control piston 21 downwardly past passageway 30. The load measuring device 5 is thus locked out of operation until the brake pipe pressure is reduced to atmosphere which operates to re-center the respective stems 38 and 51 in a manner described above.

During the initial charging of the brake pipe 4 in the usual manner, brake control valve device 1 operates to charge the respective reservoirs, auxiliary reservoir 7, emergency reservoir 8 and air reservoir 6, in the usual manner, and, in addition thereto, change-over valve device 3 operates to facilitate the charging of the respective reservoirs through the one-way check valve 100 as described above.

While the railway vehicle is in the loaded car condition and the brake pipe pressure is reduced under operator control in the usual manner for causing a brake application, brake control valve device 1 operates to supply fluid from air reservoir 6 and auxiliary reservoir 7 to the brake cylinders 15 via supply pipe 9. The pressurized fluid flows via supply pipe 9, passageway 116 and branch passageway 117 to pressurize outer control chamber 69. Simultaneously with such passage of fluid, pressurized fluid flows via passageway 116 from supply pipe 9, via annular groove 61 to passageway 118 which is connected to the intermediate chamber 70. Pressurization of the intermediate chamber 70 and the outer control chamber 69 operates to move relay valve device 65 leftwardly as viewed in FIG. 2 to unseat check valve device 89 and communicates pressurized chamber 90 via the clearance space 74, annular groove 81, passageway 82, conduit 16 to brake cylinders 15. In a similar manner as described above, preloaded check valve 83 remains unseated until sufficient pressure is developed in the clearance space 74 and the passageway 82 to overcome spring 88. Upon unseating of preload check valve 83, the pressurized fluid flows past such valve 83, thence via passageway 84 and choke 85 into balancing chamber 68 for pressurization thereof until sufficient pressure is developed to overcome the fluid pressure in the intermediate chamber 70 and the outer control chamber 69. Equalization of the net differential forces develops to seat check valve device 89 and effect a full braking application in the brake cylinders 15. A one-to-one brake ratio of brake application is provided since the effective resultant areas of the diaphragms between chambers 68, 70 and 69 is equal. Pressurization of outer control chamber 69 via passageway 117 is neutralized in effect by the pressurization of intermediate chamber 70 since they have a common diaphragm.

Any further decrease in brake pipe pressure operates to supply an additional amount of pressurized fluid from the auxiliary reservoir 7 to conduit 9 which operates to augment the pressure in the intermediate chamber 70 as described above which operates to unseat the check valve device 89 which, in turn, thereby supplements and increases the pressure in the brake cylinders 15 which increases the braking action. When the pressure in the brake pipe 4 is increased to release the brakes in a manner well known in the art, the brake cylinder supply pipe 9 is vented to atmosphere via brake control valve device 1 to thereby vent the brake cylinders 15 as well as chambers 70 and 69 of the relay valve device 65 in the manner described above.

Having now described the invention, what I claim as new and desire to secure by Letters Patent, is:

1. A change-over valve device having:
    (a) a casing,
    (b) an input connection,
    (c) selector valve means operative between a first and second position,
    (d) relay valve means having a normally seated valve member and a pair of spaced diaphragms of different effective areas wherein said diaphragms are cooperative with said casing to define three pressure chambers,
    (e) said normally seated valve member being operative upon actuation to connect a pair of passageways wherein one of said passageways is adapted to be connected to a pressure source while the other of said passageways is adapted to be connected to a brake cylinder,
    (f) one of said diaphragms being common to a pair of adjacent pressure chambers,
    (g) one of said adjacent pressure chambers being connected to said input connection for actuation of said valve member upon pressurization of said input connection,
    (h) said selector valve means in one of said positions connecting the other of said adjacent pressure chambers to said input connection for actuation of said relay valve means and actuation of said valve member upon pressurization of said input connection,
    (i) said relay valve means having the other of said pair of spaced diaphragms cooperative with a portion of said casing to define a balancing chamber,
    (j) said other diaphragm being common to said balancing chamber and said other pressure chamber, and
    (k) normally seated valve means operatively connected to said other passageway and responsive to a predetermined pressure in said other passageway to interconnect said other passageway with said balancing chamber for pressurization of said balancing chamber to balance pressure in said pressure chambers for seating said valve member.

2. A change-over valve device as set forth in claim 1 wherein:
    (a) means operatively connect said balancing chamber to said other passageway for venting said balancing chamber upon breakdown of pressure in said other passageway.

3. A load compensating brake system for a railway car comprising:
    (a) a brake pipe,
    (b) brake cylinder means for effecting a braking application,
    (c) brake controlling means responsive to a reduction in pressure in said brake pipe to supply fluid under pressure from a pressure source to a first conduit, and responsive to a subsequent increase in brake pipe pressure to release fluid under pressure from said first conduit,
    (d) a change-over valve device having selector valve means operable between a first and second position,
    (e) means for selectively positioning said selector valve means to said first or second position,
    (f) said change-over valve device having:
        (i) a sectionalized casing,
        (ii) a relay valve means having a normally seated valve member operative upon actuation to connect a pair of passageways, wherein one of said passageways is connected to a pressure source and the other of said pair of passageways is connected to said brake cylinder means,
        (iii) said relay valve means having at least a pair of spaced diaphragms of different effective areas cooperative with said casing to define three adjacent pressure chambers, (iv) a pair of said pressure chambers having a common diaphragm operative upon pressurization of one or both of said chambers to actuate said normally seated valve member, (v) one of said pair of pressure chambers connected to said first conduit, (vi) said relay valve means cooperative with said selector valve in one of said positions to connect the other of said pair of pressure chambers to said first conduit, and (vii) valve means responsive to a predetermined pressure in the other of said pair of passageways for connecting the other of said pair of passageways to the third one of said three pressure chambers for pressurization thereof and deactuating said normally seated valve member.

4. A load compensating brake system for a railway car as set forth in claim 3 wherein:

(a) said valve means comprises a normally closed check valve having means for preloading said check valve.

5. A load compensating brake system as set forth in claim 3 wherein:

(a) means interconnects said third one of said pressure chambers with said other of said pair of passageways for venting said third one of said three pressure chambers upon reduction of pressure in said other of said pair of passageways.

6. For use in a fluid pressure brake system for railway cars of the type having a brake cylinder for effecting brake application according to the degree of pressurization therein, a brake pipe normally charged with fluid pressure at a certain pressure, and a control valve device operatively responsive to the normal pressures carried in the brake pipe to effect release of fluid pressure from the brake cylinder and operatively responsive to reduction of the pressure normally carried in the brake pipe to effect supply of fluid under pressure from a source to a conduit, a changeover valve device interposed between said conduit and said brake cylinder, said change-over valve device comprising:

(a) a casing, (b) a plurality of fluid pressure responsive abutments of different effective areas respectively coaxially disposed in said casing to provide an outer control chamber, an intermediate control chamber, and a pressure balancing chamber, (c) valve means operative upon pressurization of said outer control chamber to effect supply of fluid under pressure from such source via a connection to the brake cylinder to pressurize the brake cylinder to different degrees, (d) constantly open passageway means connecting said conduit to said outer control chamber, (e) selector valve means selectively conditioned to establish the communication between said conduit and said intermediate control chamber or cut off said communication, and (f) fluid pressure responsive means responsive to a predetermined pressure in said connection to the brake cylinder to connect the pressure in said connection to said balancing chamber for pressurization of said balancing chamber to balance the pressure developed in said intermediate chamber and said outer control chamber to thereby render said valve means inoperative.

7. A relay valve device comprising:

(a) a casing, (b) movable abutment means having diaphragms of different effective areas cooperative with said casing to provide an outer control chamber, an intermediate control chamber, and a pressure balancing chamber, (c) said control chambers subject to being selectively pressurized, (d) valve means operative upon pressurization of said outer control chamber or said control chambers to effect supply of pressurized fluid from a pressure source to a conduit means adapted to be connected to a receiving device to pressurize such receiving device to different degrees, and (e) means for delaying the supplying of fluid under pressure to said balancing chamber to balance the pressures in said control chambers until the pressurization in said conduit exceeds a certain pressure.

8. A relay valve device comprising:

(a) a casing, (b) a pair of input connections subject to being pressurized, (c) movable abutment means having diaphragms of different effective areas cooperative with said casing to provide an outer control chamber, an intermediate control chamber, and a pressure balancing chamber, (d) said control chambers selectively connectible to said pair of input connections, (e) valve means operative upon pressurization of said outer control chamber or said control chambers to effect supply of pressurized fluid from a pressure source to a conduit means adapted to be connected to a receiving device to pressurize such receiving device to different degrees, and (f) normally seated loaded check valve means responsive to a certain predetermined pressure in said conduit means to be unseated to connect said balancing chamber to said conduit means for pressurization of said balancing chamber to balance the pressure developed in said control chambers.

9. A relay valve device comprising:

(a) a casing, (b) a normally seated valve member operative upon actuation to connect a pair of passageways, wherein one of said passageways is adapted to be connected to a pressure source and the other of said passageways is adapted to be connected to a receiving device, (c) a pair of spaced diaphragm means of different effective areas cooperative with said casing to define an outer control chamber, an intermediate control chamber, and a balancing chamber, (d) means for controlling the actuation of said control chambers to effect degrees of pressurization thereof, and (e) valve means responsive to rising pressure in said other passageway above a predetermined pressure to connect said balancing chamber to said other passageway.

10. A relay valve device as set forth in claim 9 wherein said valve means is responsive to a falling pressure in said other passageway to connect said balancing chamber to said other passageway to vent said balancing chamber.

11. A load compensating brake system as set forth in claim 4 and further characterized by second valve means subject to respective opposing pressures in said other of said pair of passageways and in said third one of said three pressure chambers, said second valve means being operable responsively to reduction of pressure in said other of said pair of passageways for venting said third one of said three pressure chambers.

References Cited in the file of this patent

UNITED STATES PATENTS

| | | |
|---|---|---|
| 2,919,164 | Weber | Dec. 29, 1959 |
| 2,919,165 | Cotter et al. | Dec. 29, 1959 |